United States Patent
Teglia et al.

(10) Patent No.: US 8,239,833 B2
(45) Date of Patent: Aug. 7, 2012

(54) STATISTICAL CONTROL OF THE INTEGRITY OF A PROGRAM

(75) Inventors: Yannick Teglia, Marseilles (FR); Pierre-Yvan Liardet, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 1446 days.

(21) Appl. No.: 10/877,884

(22) Filed: Jun. 25, 2004

(65) Prior Publication Data
US 2004/0268313 A1 Dec. 30, 2004

(30) Foreign Application Priority Data
Jun. 26, 2003 (FR) ...................................... 03 50258

(51) Int. Cl.
G06F 9/44 (2006.01)
G06F 17/00 (2006.01)

(52) U.S. Cl. ........ 717/126; 717/121; 717/127; 717/131; 707/687

(58) Field of Classification Search .......... 717/126–128, 717/100, 131, 141–143, 154, 130, 124, 158; 714/37–39; 726/22–25
See application file for complete search history.

(56) References Cited

U.S. PATENT DOCUMENTS

| | | | | |
|---|---|---|---|---|
| 5,230,050 A * | 7/1993 | Iitsuka et al. | ................. | 717/145 |
| 5,668,999 A * | 9/1997 | Gosling | ........................ | 717/126 |
| 5,809,450 A * | 9/1998 | Chrysos et al. | ............... | 702/186 |
| 6,075,940 A * | 6/2000 | Gosling | ........................ | 717/126 |
| 6,118,447 A * | 9/2000 | Harel | ............................. | 717/131 |
| 6,567,924 B1 * | 5/2003 | McGee et al. | ................ | 713/502 |
| 6,611,930 B1 * | 8/2003 | Ostrowsky et al. | ........... | 714/718 |
| 6,681,331 B1 * | 1/2004 | Munson et al. | ................. | 726/23 |
| 6,681,383 B1 * | 1/2004 | Pastor et al. | .................... | 717/126 |
| 6,880,149 B2 * | 4/2005 | Cronce | ........................ | 717/126 |
| 7,007,270 B2 * | 2/2006 | Martin et al. | ................. | 717/131 |
| 7,065,746 B2 * | 6/2006 | Szabo et al. | .................... | 717/121 |
| 7,194,732 B2 * | 3/2007 | Fisher et al. | ................... | 717/131 |
| 7,457,781 B1 * | 11/2008 | Weaver et al. | ................... | 705/64 |
| 7,529,738 B2 * | 5/2009 | Christiance et al. | .......... | 707/687 |
| 7,653,647 B2 * | 1/2010 | Borthakur et al. | ............ | 707/687 |
| 7,865,876 B2 * | 1/2011 | Griffin et al. | ................. | 717/121 |
| 2002/0104075 A1 * | 8/2002 | Bala et al. | ..................... | 717/136 |

(Continued)

FOREIGN PATENT DOCUMENTS
WO     WO 01 69356 A     9/2001

OTHER PUBLICATIONS

Darko Kirovski, Milenko Drinic, Miodrag Potkonjak. "Enabling trusted Software Integrity" 2002 ACM 1-58113-574-2/02/0010 . . . ASPLOS X Oct. 2002 San Jose, CA, USA. pp. 108-120.*

(Continued)

Primary Examiner — Thuy Dao
(74) Attorney, Agent, or Firm — Wolf, Greenfield & Sacks, P.C.

(57) ABSTRACT

A method for controlling the execution of a program implementing successive operations, including, during program execution, comparing each operation with a pre-established list, and for each operation contained in the list, incrementing and memorizing a number of occurrences of this operation; and at the end of the program execution, comparing the number of occurrences of the current program execution for each operation with previously-stored ranges of numbers of occurrences assigned to each operation.

18 Claims, 1 Drawing Sheet

U.S. PATENT DOCUMENTS

| | | | |
|---|---|---|---|
| 2002/0169969 A1* | 11/2002 | Watanabe et al. | 713/190 |
| 2004/0049769 A1* | 3/2004 | Lueh et al. | 717/158 |
| 2004/0117784 A1* | 6/2004 | Endoh | 717/169 |
| 2004/0193467 A1* | 9/2004 | Williams et al. | 705/8 |
| 2006/0026569 A1* | 2/2006 | Oerting et al. | 717/126 |
| 2006/0101408 A1* | 5/2006 | Kotamarthi et al. | 717/126 |
| 2006/0167801 A1* | 7/2006 | Stefik et al. | 705/51 |
| 2007/0106981 A1* | 5/2007 | Bird | 717/127 |

OTHER PUBLICATIONS

D. Spinellis, Reflection as a mechanism for software integrity verification, Feb. 2000, 12 pages, <http://delivery.acm.org/10.1145/360000/353383/p51-spinellis.pdf>.*

Rivero et al., Static detection of sources of dynamic anomalies in a network of referential integrity restrictions, Mar. 2000, 7 pages, <http://delivery.acm.org/10.1145/340000/335785/p333-rivero.pdf>.*

D. Sosenblum, CAREER: mechanisms for ensuring the integrity of distributed object systems, Jan. 2000, 2 pages, <http://delivery.acm.org/10.1145/350000/341008/p78-rosenblum.pdf>.*

French Search Report from corresponding French National Application No. 03/50258, filed Jun. 26, 2003.

Nachenberg, C.S., *A New Technique for Detecting Polymorphic Computer Viruses. A thesis Submitted in Partial Satisfaction of the Requirements for the Degree Master of Science in Computer Science and Engineering*; Thesis University of California, 1995, pp. I-V, 1-127, XP000197628.

* cited by examiner

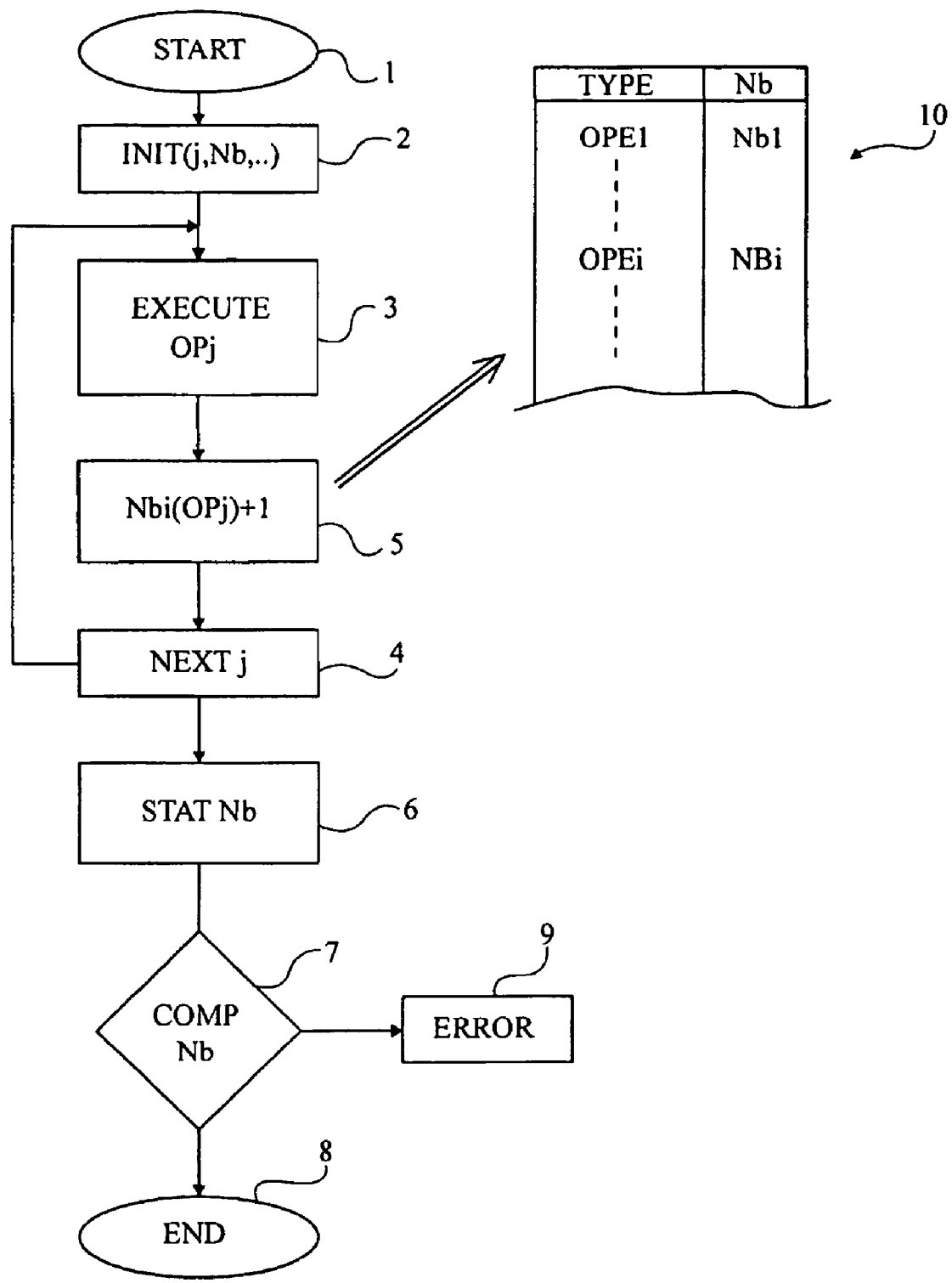

STATISTICAL CONTROL OF THE INTEGRITY OF A PROGRAM

BACKGROUND OF THE INVENTION

1. Field of the Invention

The present invention generally relates to the execution of programs (software codes) by an integrated microprocessor. The present invention more specifically relates to the control of the integrity of a program upon execution thereof, to check that the program has not been modified on purpose or incidentally since its installation. Such modifications may result from computer viruses or piracy attempts including, more specifically, of fault injections in the execution of programs.

2. Discussion of the Related Art

A so-called trap fault injection attack may include the introduction of a disturbance on the processor supply for a short time. Such an attack causes an unexpected jump in the program execution sequence. Most often, such an attack occurs when the program has looped back or has stopped on a blocking instruction after an authentication failure, for example, in an application where a processor must decide whether a specific operation is allowed (for example, in the case of credit cards, the authorization of a bank transaction after authentication of the user).

Another type of attack affecting the execution of a cryptography algorithm includes having the program counter jump to cause an unexpected jump in the execution sequence, even if the program has not stopped in a loop upon authentication. For example, for cryptography algorithms such as Digital Signature Algorithm (DSA), Rivest-Shamir-Adleman (RSA), Data Encryption Standard (DES), Advanced Encryption Standard (AES), the secret keys can be discovered by a piracy causing instruction jumps.

To protect the software code upon execution thereof, a periodic checking of this code is generally provided based on an authentication key stored in a memory or in the integrated circuit, for example, upon initial storage of the program or installation thereof.

For example, a signature (application of an encryption algorithm to at least a portion of the software code) is calculated upon installation or writing of the program. This signature is then stored in or outside of the integrated circuit executing the program. Then, upon execution of the software code, the operating system recalculates a signature based on the same algorithm as that having served to the generation of the initial signature. The current signature is then compared with the predetermined signature. A divergence between the two signatures means that the stored program has been modified and thus enables identifying a potential unwanted or incidental attack.

An example of such an integrity checking method is described in U.S. Pat. No. 5,442,645, which is incorporated herein by reference.

A disadvantage of known solutions is that in case of an updating of the software with a more recent version, it is then necessary to update the predetermined signature. Such an updating may be penalizing especially in case of a frequent updating of the system.

Further, program updatings more and more often occur via Internet-type communication networks, and it is not desirable to multiply signature calculations to be re-recorded in the integrated circuit on the user side.

Another disadvantage of conventional solutions is that the integrity checking is static, that is, at the beginning of the program, it is checked whether the signature is or not authorized. Accordingly, such a protection system is in practice inefficient in case of a fault injection during program execution.

SUMMARY OF THE INVENTION

The present invention aims at providing a method for checking the integrity of a program during execution which overcomes the disadvantages of known solutions.

The present invention especially aims at providing a solution which requires no updating of a signature upon each updating of the software code to be protected.

The present invention also aims at enabling dynamic checking, that is, which enables detecting fault injections during program execution.

To achieve these and other objects, the present invention provides a method for controlling the execution of a program implementing successive operations, consisting of:

during program execution, comparing each operation with a pre-established list, and for each operation contained in the list, incrementing and storing a number of occurrences of this operation; and at the end of the program execution, comparing the number of occurrences of the current program execution for each operation with previously-stored ranges of numbers of occurrences assigned to each operation.

According to an embodiment of the present invention, said ranges of values are determined by analysis of the possible statistical differences of the numbers of occurrences with respect to one or several program executions.

According to an embodiment of the present invention, the numbers of current occurrences are stored in a table.

According to an embodiment of the present invention, the increment value is weighted according to the nature and/or the position of the operation in the program.

The present invention also provides a processor for executing a program, comprising an area for storing a table of numbers of operation occurrences upon execution of a program.

The foregoing objects, features, and advantages of the present invention will be discussed in detail in the following non-limiting description of specific embodiments in connection with the accompanying drawing, which very schematically illustrates an embodiment of the present invention.

DETAILED DESCRIPTION

For clarity, only those elements necessary to the understanding of the present invention have been shown and will be described hereafter. In particular, the operators or instructions concerned by the implementation of the present invention have not been described in detail; the present invention applies whatever the type of operator. Further, all the components necessary to the execution of a program, be it by means of a software implementation or by means of a state machine in wired logic, have not been described in detail; they may be formed using conventional elements.

A feature of the present invention is to cumulate during execution of a program to be monitored, the number of occurrences of operators, of instructions, or of groups of predetermined instructions and to control, at the end of the program execution, that the numbers of detected occurrences remain within a range of admitted values to consider that the program that has just been executed effectively is authentic.

Preferably, the ranges of authorized variations are statistically calculated according to the type of operator, of instruction, or of the operation group involved. For such a determination, account is especially taken of the mean frequency of occurrence of a given operation in a program.

Reference will be made hereafter to term "operator" or "operation" to designate the program elements having their number of occurrences, according to the present invention, monitored. Thus, an operation may be an operation code, an instruction, or an instruction group (for example, the access to a memory address or to a register, be it for a reading or a writing of data or for the execution of a stored code) and more generally any digital element likely to be monitored through its number of occurrences in a computer program.

Still according to a preferred embodiment, a table of occurrences of the operations to be monitored is calculated and is memorized in one or several program executions (for example, with random data) from which statistics are deduced or, as an alternative, upon its design or its installation.

The appended drawing very schematically illustrates in the form of blocks an embodiment of the method according to the present invention. This drawing illustrates the execution of a program to be monitored by the method of the present invention.

Upon starting of a program (block 1, START), some components are conventionally initialized (for example, the program counter). According to the present invention, advantage is taken of this initialization step (block 2, INIT(j, Nb, ...))) to initialize a stored table of occurrences 10, inside or outside of the integrated circuit executing the program. Table 10 associates, according to the present invention, to each type TYPE of operation OPEi to be monitored, a number Nbi of occurrences of this operation upon execution of the program.

The occurrence table, and more specifically the types of operations to be monitored, are according to an embodiment, defined in the beginning of the executed program. As an alternative, for a given tool (integrated circuit), certain operations, the number of occurrences of which will be monitored whatever the program which happens to be executed, are predefined.

Conventionally, the execution of a program consists of a successive execution (block 3, EXECUTE $Op_j$) of the different instructions, operators, or instruction groups until the end of the program. Thus, this execution may be symbolized with a loop in which it is proceeded to the execution of the next operator (block 4, NEXTj) each time an operation is over.

According to the present invention, within the execution loop, that is, just after the execution of an operation (block 3), a function (block 5, $Nb_i(OP_j)+1$) incrementing the number of occurrences of the current operation in table 10 is implemented.

The implementation of such a function is within the abilities of those skilled in the art based on the functional indications given in the present description. It is, in simplified fashion, a simple identity search function between the current operation and a pre-established list of table 10 and, if the operation corresponds to one from the list, the occurrence number counter is incremented in this table.

Once the program execution is over, that is, when there is no further operation OPj to be processed, the program linked to the actual application ends. A function (block 6 STAT Nb) specific to a preferred embodiment of the present invention which consists of extracting, from a memory, preferably non-volatile, from an external interrogation, for example, to a data server, etc., a predetermined table of statistic occurrences, is then executed.

The number of current occurrences of table 10 is then compared (block 7, COMP Nb) with the admitted range of values based on statistic table 6.

If the current numbers are comprised in the admissible ranges, the program ends (block 8, END) normally. In the opposite case, the method of the present invention generates a warning message (block 9, ERROR).

The reference table is, for example, calculated upon installation of the program or its first execution to determine the number of occurrences of the different operations significant for the implementation of the present invention.

The fact of collecting statistic information of occurrences of the program operations enables checking, in subsequent uses, that there is no statistically significant interval between the stored predetermined values and the current values. Thus, if a program updating is recorded on the concerned support, there is no reason for its statistical signature to be modified. However, if an attempt of piracy by fault injection occurs or if a virus introduction disturbs the program operation, the statistical signature will become different, which will enable detecting a kind of error probability. According to a specific embodiment, it is possible to only store the partial statistics concerning the program portion considered as being the most critical or the least liable to vary.

According to another embodiment, a time or position weighting in the program of the operation occurrence statistics may be used since, for example, as concerns computer viruses, it is known that the latter will modify with priority the beginning of the program to execute first and then leave place to the initial program. In this case, the first operation codes used will be assigned a greater weighting coefficient to more easily detect a fraud attempt.

For the selection of the operations, the number of occurrences of which is desired to be monitored, the operation type desired to be monitored may be taken into account. For example, if the method of the present invention is more specifically intended to detect the presence of a computer virus, it may be desired to more specifically monitor memory write operations, knowing that this type of operations is that performed in privileged fashion by a computer virus.

The choice of the types of operations, instructions, instruction groups, to be checked in terms of number of occurrences is within the abilities of those skilled in the art according to the application and to the type of program involved. For example, the number of external memory accesses, the number of multiplications, the number of random drawing loadings, etc. could be counted.

An advantage of the present invention is that in case of a program updating, the statistical signature remains the same. In particular, the operations constitutive of a DES-type algorithm (Data Encryption Standard) are not modified from one version to another.

Another advantage of the present invention is that the checking is performed at the end of the program execution. Thus, fault injections can be detected.

Of course, the present invention is likely to have various alterations, modifications, and improvements which will readily occur to those skilled in the art. In particular, the number and the type of operations depends on the program, the execution of which is desired to be monitored.

Further, the statistical tolerance acceptable for the numbers of occurrences of the monitored operations may correspond in practice to the threshold setting around a determined value upon first execution of the program. On this regard, it should be noted that the tolerance range around this value is not only used to enable installation of updatings without requiring a modification of the pre-recorded occurrence table, but also to take into account the fact that some operations may be executed a different number of times from one execution to the other of the software (for example, operators such as the number of times it is passed in a loop, which depends on input data, the number of squarings and of multiplications, which depends on the exponent of the modular exponentiation (so-called "Square-Multiply" technique), or the number of executions of an elementary write function in a memory which depends on the size of the data to be written).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, executed by a processor, for checking an execution of a program comprising a plurality of operations, the method comprising:
   during the execution of the program, comparing each operation of the plurality of operations with a plurality of operation types to determine whether the each operation is of an operation type contained in the plurality of operation types, and if so, incrementing and storing in memory a number of occurrences for the operation type; and
   at the end of the execution of the program, comparing, for each operation type contained in the plurality of operation types, the number of occurrences of the each operation type during the execution of the program with a previously-stored range of numbers of occurrences assigned to the each operation type,
   wherein the execution of the program is a current execution of the program, and wherein said previously-stored range is determined by statistical analysis of numbers of occurrences of the each operation type during a plurality of previous executions of the program.

2. The method of claim 1, wherein, for each operation type contained in the plurality of operation types, the number of occurrences for the each operation type during the current execution of the program is stored in a table indexed by the plurality of operation types.

3. The method of claim 1, wherein, for at least one operation of the plurality of operations, the number of occurrences for a corresponding operation type is incremented by an increment value that is weighted according to a nature and/or position of the at least one operation in the program.

4. A processor adapted to perform the method of claim 1, the processor comprising an area for storing, for each operation type in the plurality of operation types, the number of occurrences for the each operation type during the current execution of the program, the number of occurrences for the each operation type being accessible by providing the each operation type.

5. The method of claim 1, wherein the statistical analysis calculates an average number of occurrences of an operation type during the plurality of previous executions of the program.

6. A method, executed by a processor, for checking an execution of a program, the execution comprising one or more operations, the one or more operations comprising a first operation and a second operation different from the first operation, the one or more operations being of one or, more operation types, the one or more operation types comprising a first operation type, the method comprising:
   determining whether the first operation is of the first operation type, and if so, incrementing an occurrence count for the first operation type;
   determining whether the second operation is of the first operation type, and if so, incrementing the occurrence count for the first operation type;
   storing in memory the occurrence count for the first operation type; and
   comparing the occurrence count with a range of admitted values, the range of admitted values being based on at least one value derived from a plurality of previous executions of the program.

7. The method of claim 6, further comprising:
   determining whether the integrity of the program has been violated based on the comparison of the occurrence count and the range of admitted values.

8. The method of claim 7, wherein the at least one value comprises an average number of occurrences of the first operation type for the plurality of previous executions of the program.

9. A method, executed by a processor, for checking a current execution of a program comprising a plurality of operations of one or more operation types, the plurality of operations comprising a first operation and a second operation different from the first operation, the method comprising:
   determining a first occurrence count for a first operation type during the current execution of the program at least in part by determining whether the first operation is of the first operation type and whether the second operation is of the first operation type; and
   determining whether integrity of the program has been violated based at least in part on the first occurrence count and at least one value regarding occurrences of the first operation type during a plurality of previous executions of the program, wherein the at least one value comprises an average number of occurrences of the first operation type for the plurality of previous executions of the program.

10. The method of claim 9, further comprising:
    determining, for at least one operation of the first operation type, a position of the at least one operation within the program;
    wherein the determination as to whether the integrity of the program has been violated is further based on the position of the at least one operation.

11. The method of claim 9, wherein the determination as to whether the integrity of the program has been violated is further based on operation type.

12. The method of claim 9, wherein the first occurrence count is determined by incrementing a counter by one each time an operation of the first type is executed.

13. The method of claim 9, wherein the method detects a computer virus, piracy attempt and/or fault injection.

14. A method, executed by a processor, for checking one or more first executions of a program comprising a plurality of operations of one or more operation types, the plurality of operations comprising a first operation and a second operation different from the first operation, the method comprising:
    storing a first value regarding occurrences of an operation type during the one or more first executions of the program, the first value computed at least in part by determining whether the first operation is of the first operation type and whether the second operation is of the first operation type; and
    checking integrity of the program at least partially based on the first value and a second value regarding occurrences of the operation type in a plurality of second executions of the program that are carried out prior to the one or more first executions, wherein the first value is an average number of occurrences of the operation type during the one or more first executions of the program.

15. The method of claim 14, wherein the second value is at least partially based on an occurrence count for the operation type.

16. The method of claim 14, further comprising:
indicating that the checking of the program has failed if the second value differs from the first value by more than a threshold value.

17. A device that checks one or more first executions of a program comprising a plurality of operations of one or more operation types, the plurality of operations comprising a first operation and a second operation different from the first operation, the device comprising:
at least one memory that stores a first value regarding occurrences of an operation type during the one or more first executions of the program, the first value computed at least in part by determining whether the first operation is of the first operation type and whether the second operation is of the first operation type; and
at least one processor coupled to the memory that checks integrity of the program at least partially based on the first value and a second value regarding occurrences of the operation type in a plurality of previous executions of the program, wherein the second value is at least partially based on an average occurrence count for the operation type during the plurality of previous executions of the program, wherein the average occurrence count is stored in the at least one memory.

18. The device of claim 17, wherein the device is configured to generate a warning message if the checking of the integrity of the program fails.

* * * * *

UNITED STATES PATENT AND TRADEMARK OFFICE
CERTIFICATE OF CORRECTION

PATENT NO. : 8,239,833 B2
APPLICATION NO. : 10/877884
DATED : August 7, 2012
INVENTOR(S) : Yannick Teglia et al.

Page 1 of 1

It is certified that error appears in the above-identified patent and that said Letters Patent is hereby corrected as shown below:

Col. 1, line 34, should read:
tion Standard (AES) ETC., the secret keys can be discovered by a Signed and Sealed this
Eleventh Day of September, 2012

David J. Kappos
*Director of the United States Patent and Trademark Office*